R. S. CORLETT.
APPARATUS FOR CONTROLLING USE OF TOWELS.
APPLICATION FILED JAN. 5, 1912.
1,222,532.
Patented Apr. 10, 1917.
8 SHEETS—SHEET 4.
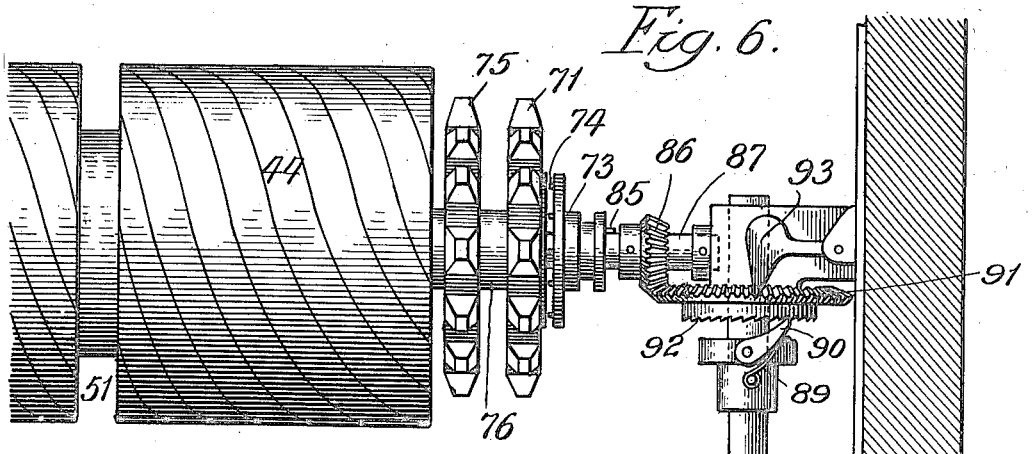
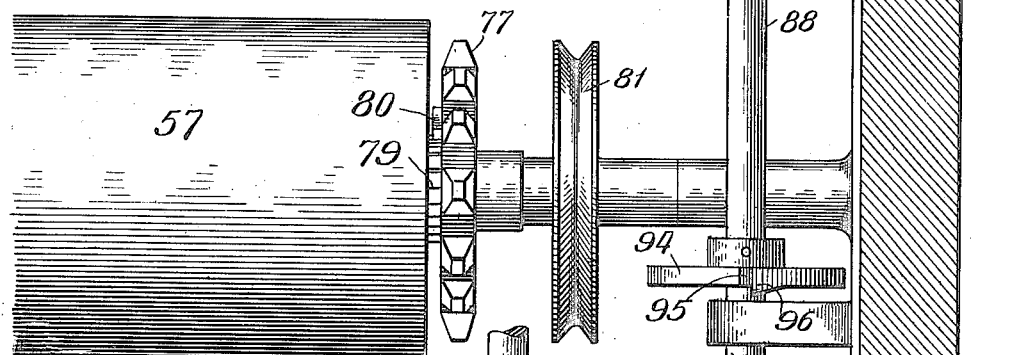
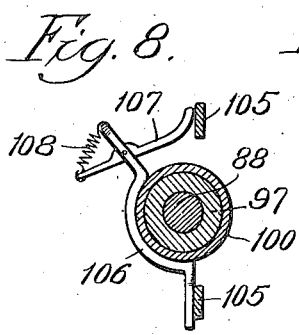
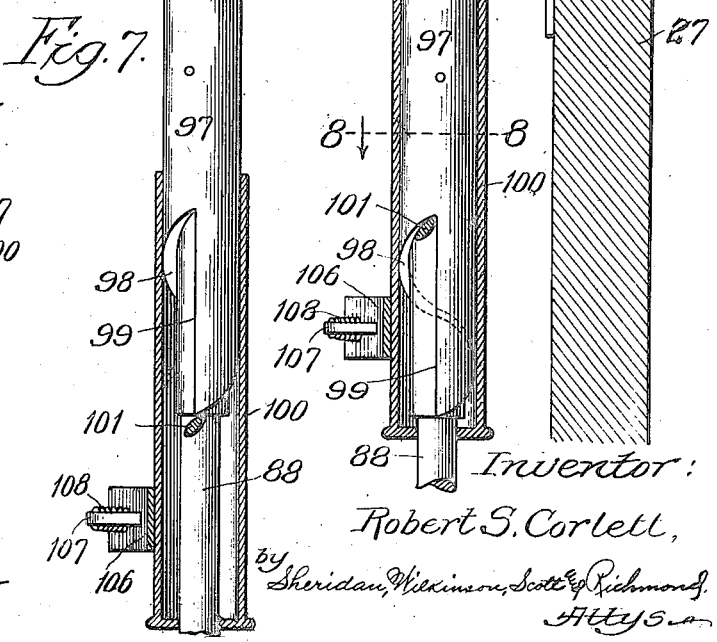
Witnesses:
John Enders
Henry A. Parks
Inventor:
Robert S. Corlett,
by Sheridan, Wilkinson, Scott & Richmond,
Attys.

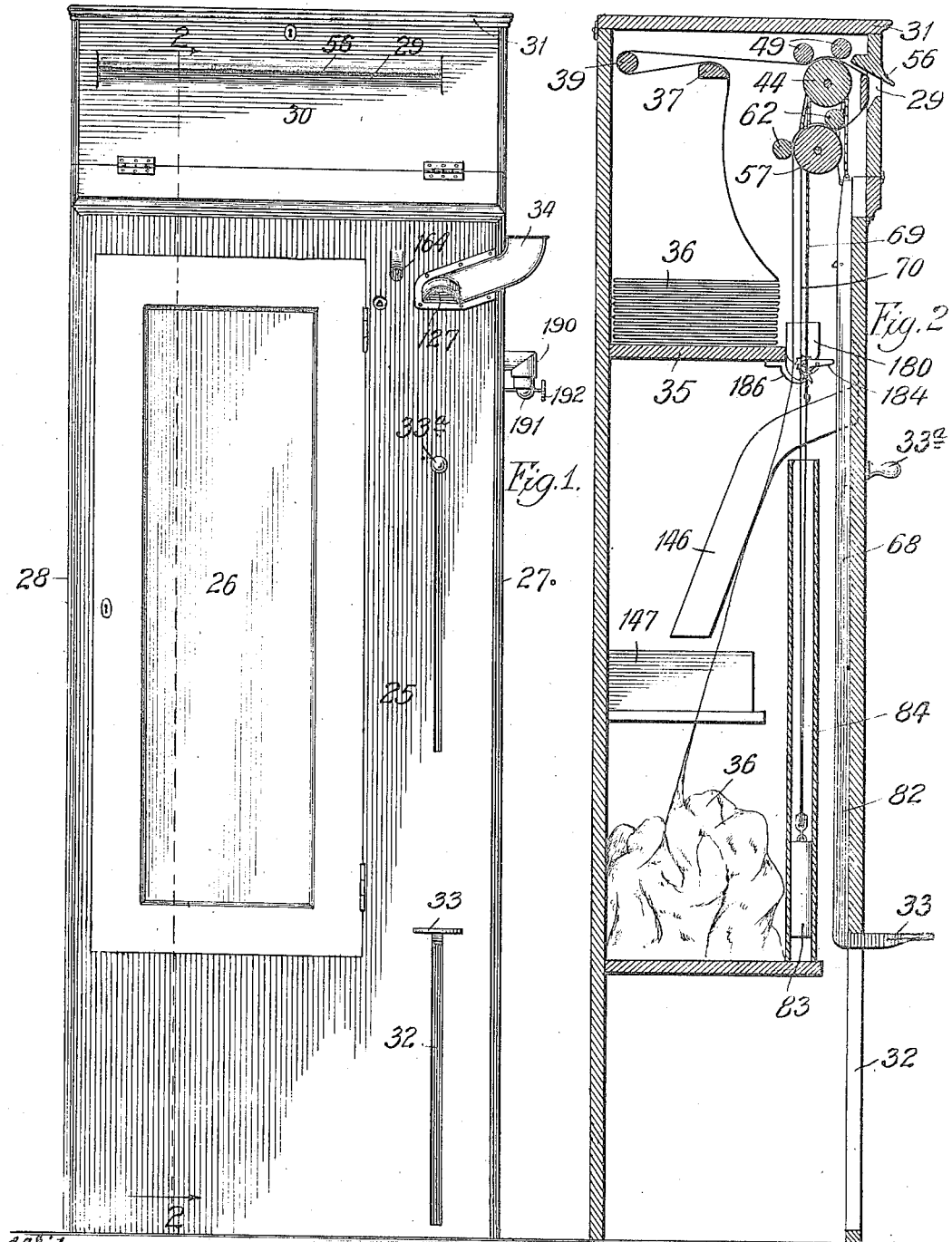

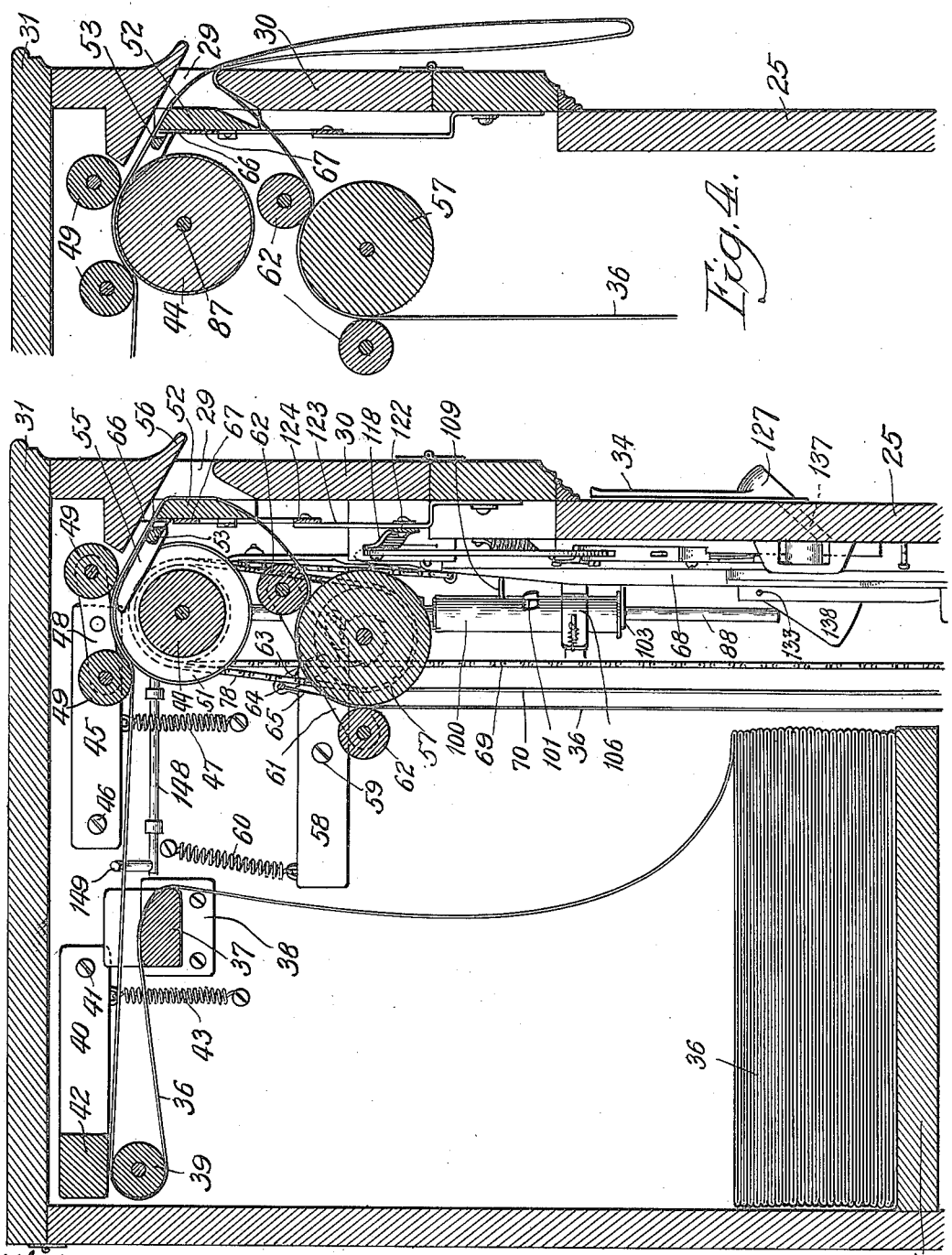

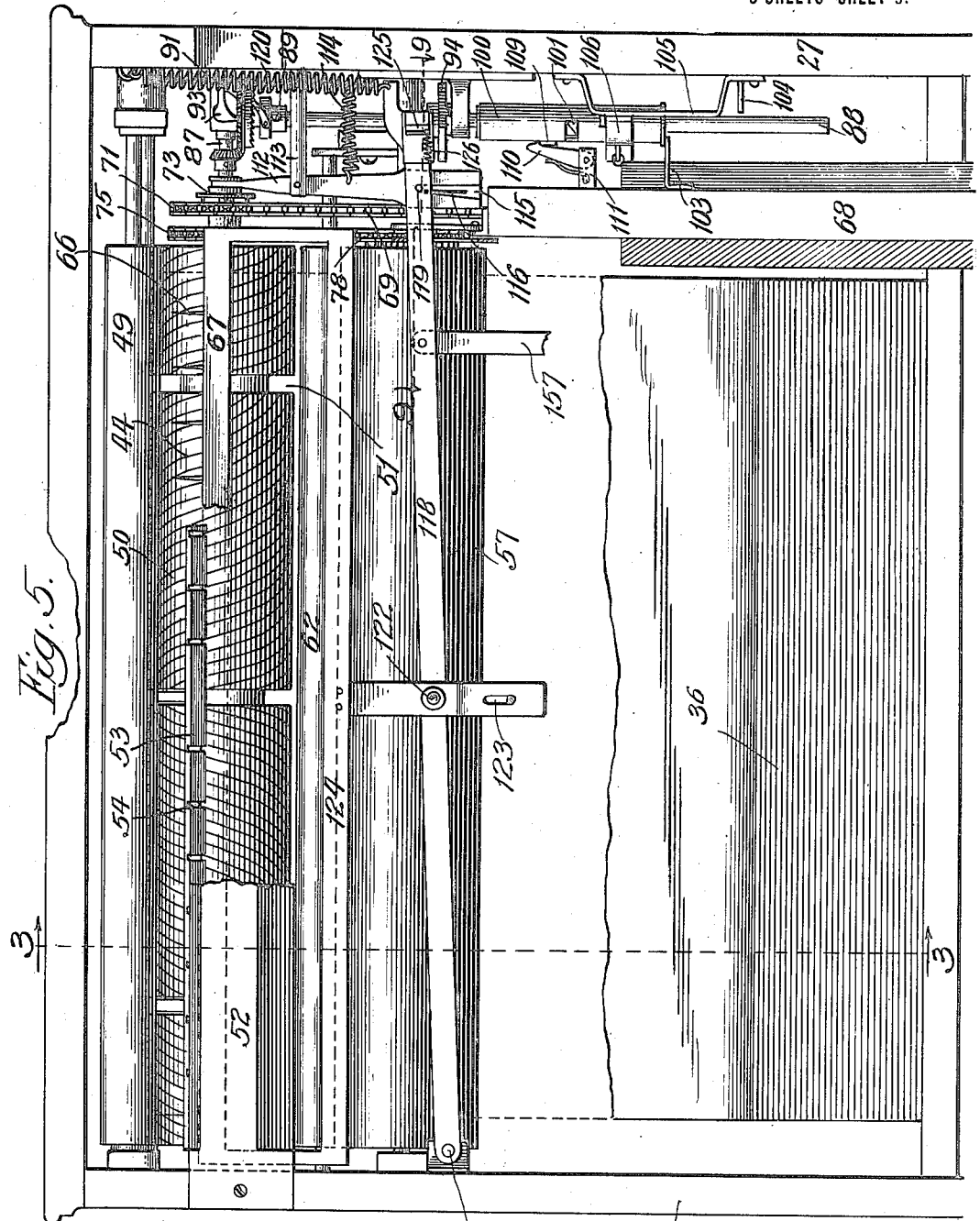

R. S. CORLETT.
APPARATUS FOR CONTROLLING USE OF TOWELS.
APPLICATION FILED JAN. 5, 1912.
1,222,532.
Patented Apr. 10, 1917.
8 SHEETS—SHEET 5.
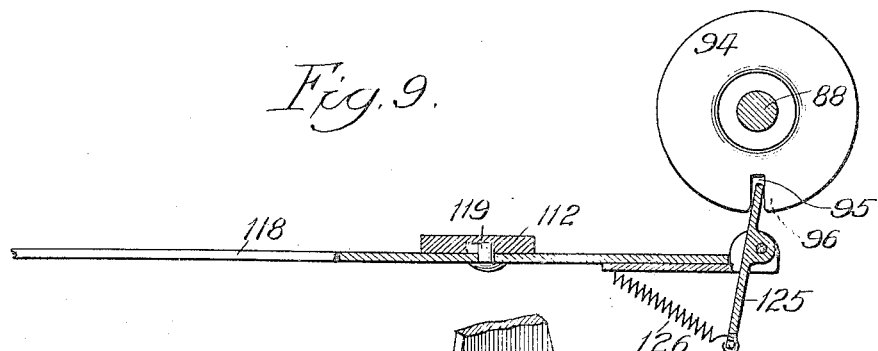
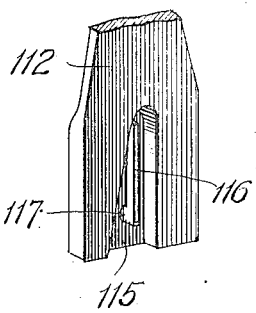
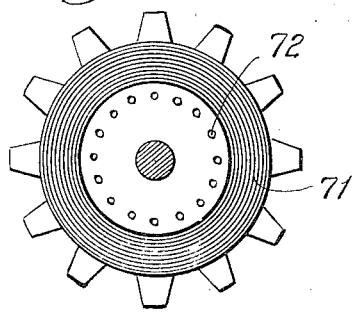
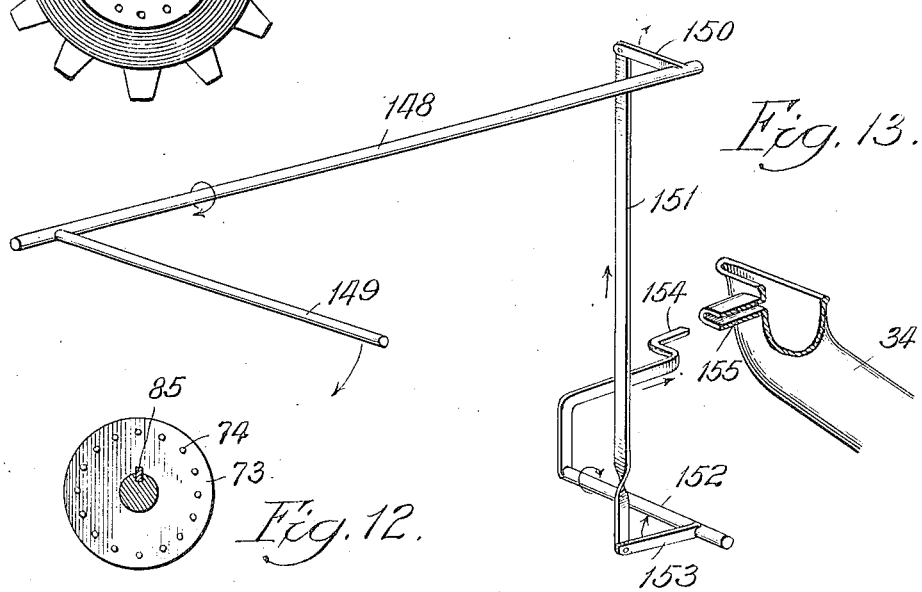

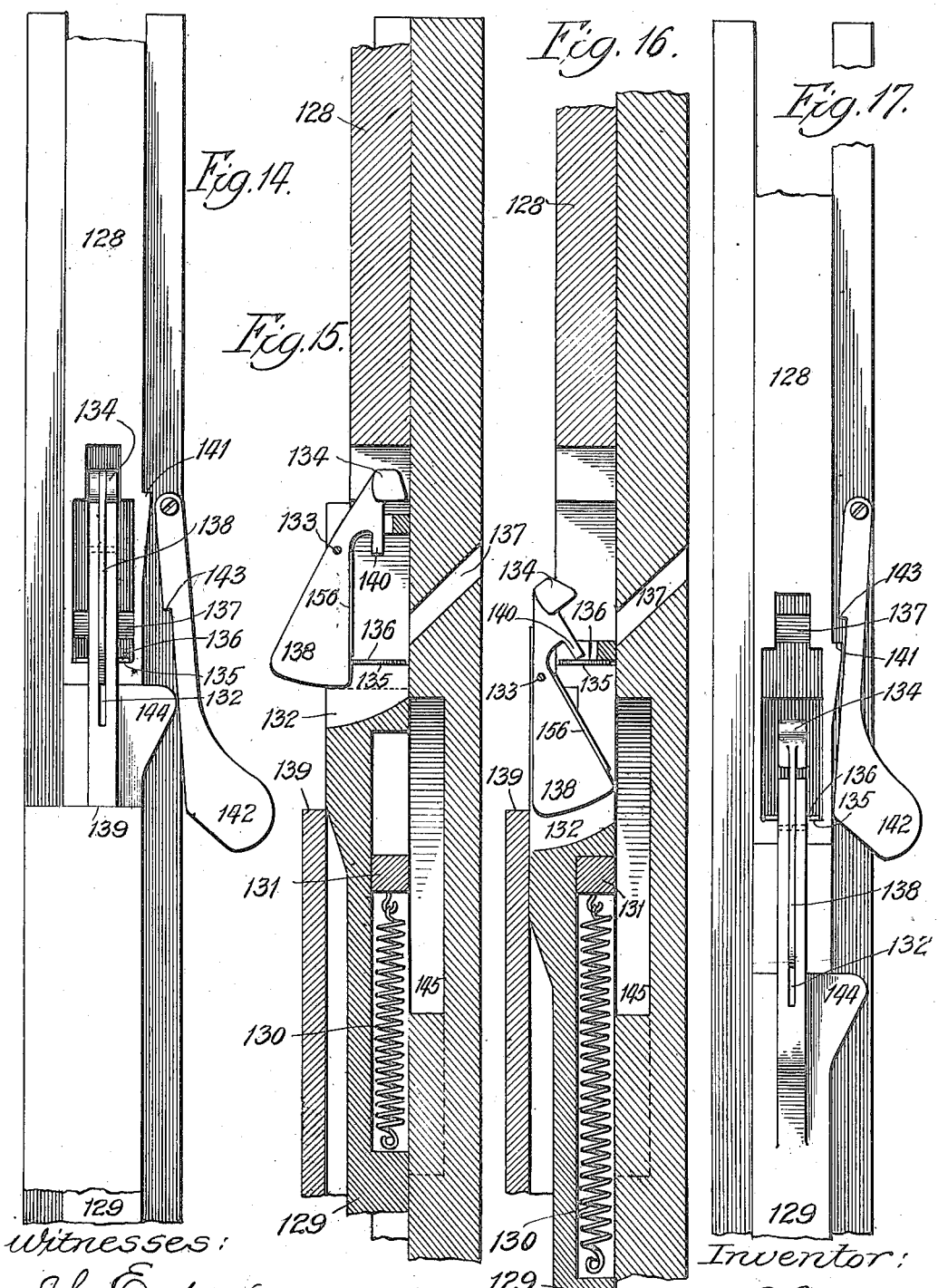

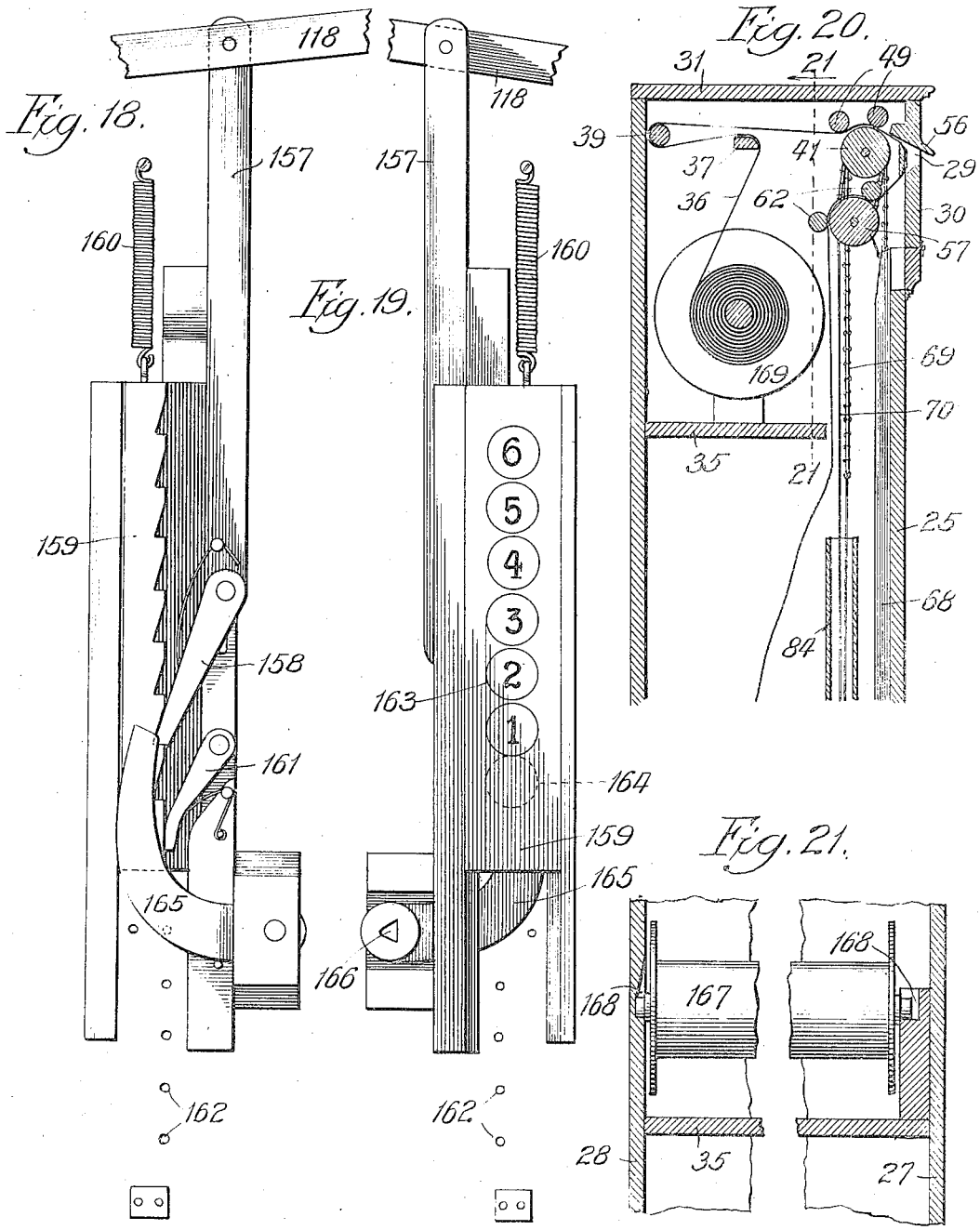

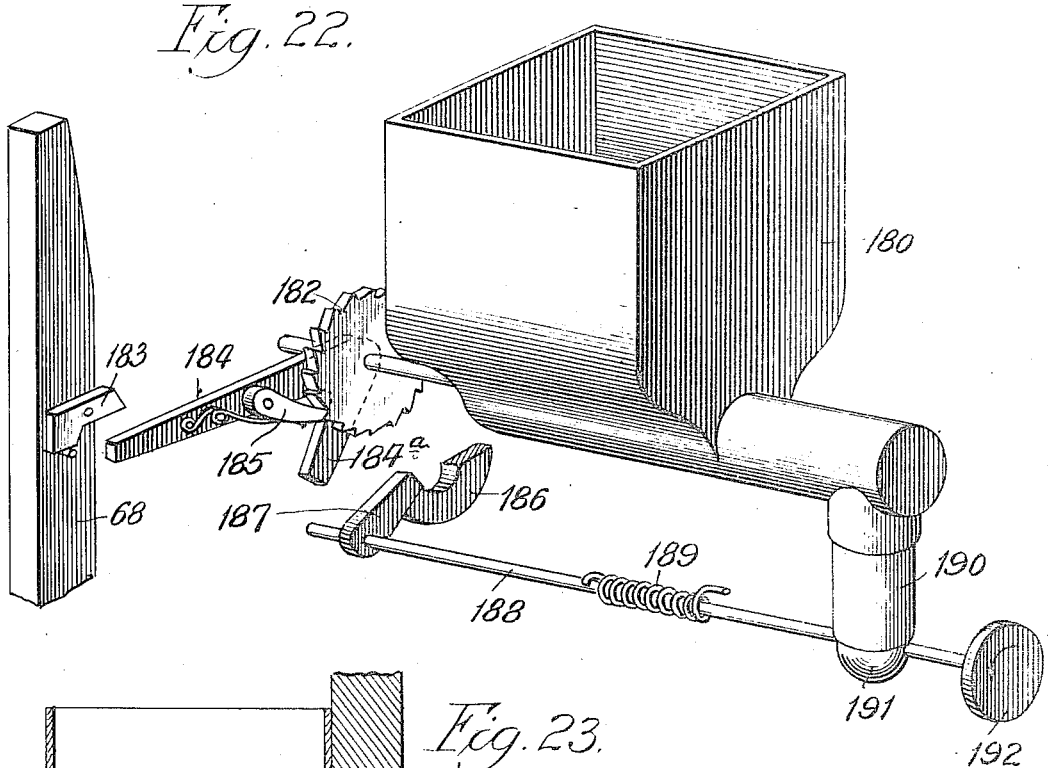
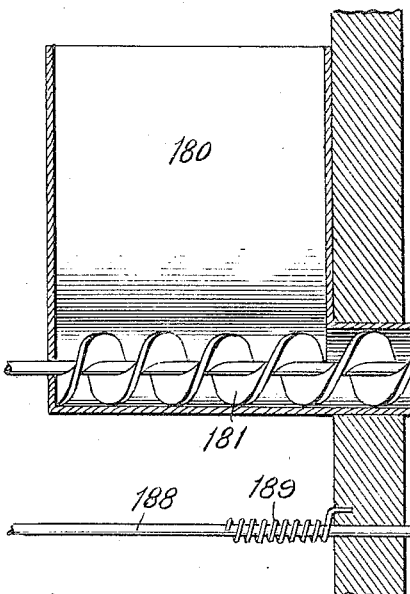
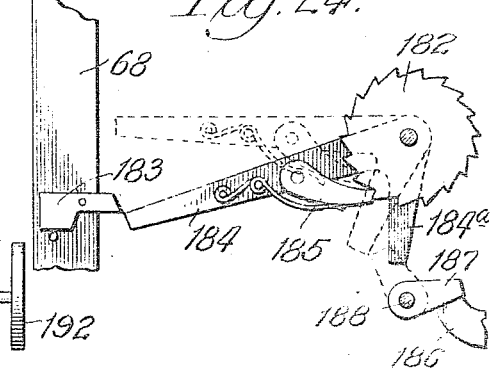

UNITED STATES PATENT OFFICE.

ROBERT S. CORLETT, OF EVANSTON, ILLINOIS, ASSIGNOR TO JACQUES ROUSSO, OF CHICAGO, ILLINOIS.

APPARATUS FOR CONTROLLING USE OF TOWELS.

1,222,532.      Specification of Letters Patent.      Patented Apr. 10, 1917.

Application filed January 5, 1912. Serial No. 669,543.

*To all whom it may concern:*

Be it known that I, ROBERT S. CORLETT, a citizen of the United States, residing at Evanston, in the county of Cook and State of Illinois, have invented certain new and useful Improvements in Apparatus for Controlling Use of Towels, of which the following is a specification.

The principal object of my invention is to provide a new and improved apparatus for supplying a long towel in installments to users. Another object of my invention is to provide a machine that will feed out consecutive portions of a long towel to users and alternately draw back into the machine the used portions thereof. These objects and various others will be appreciated and understood in connection with the following specification and accompanying drawings, taken with the appended claims.

For the purpose of explaining the nature of my invention, I have illustrated one embodiment thereof in the accompanying drawings together with some attachments and a modification. While the drawings disclose a particular specific arrangement of my invention, of course there may be various others falling within the scope of the appended claims.

Referring to these drawings—

Figure 1 is a front elevation of the apparatus.

Fig. 2 is a vertical section taken on the line 2—2 of Fig. 1, looking in the direction of the arrows.

Fig. 3 is a vertical section on an enlarged scale, taken on the line 3—3 of Fig. 5, looking in the direction of the arrows.

Fig. 4 is a fragmentary section corresponding with a part of Fig. 3, but showing certain elements in a different relation.

Fig. 5 is a front elevation of the upper part of the apparatus, the front part of the casing being removed.

Fig. 5ª is a side elevation showing a detail.

Fig. 6 is an enlarged elevation partly in section of certain apparatus shown at the right of Fig. 5.

Fig. 7 is a fragmentary sectional elevation of certain parts shown in a different relation in Fig. 6.

Fig. 8 is a horizontal section taken on the line 8—8 of Fig. 6 looking down.

Fig. 9 is a horizontal section of a detail taken on the line 9—9 of Fig. 5 looking down.

Fig. 10 is a perspective view of another detail that is associated with the parts shown in Fig. 9.

Figs. 11 and 12 are sectional elevations of clutch members shown in the upper part of Fig. 6, the two views being taken looking in opposite directions.

Fig. 13 is a perspective view of certain elements of apparatus to be described later.

Fig. 14 is a rear elevation of coin controlling apparatus.

Figs. 15 and 16 are vertical sections of the same showing certain working parts in different relative positions.

Fig. 17 is an elevation similar to Fig. 14, but showing the parts in different relation.

Fig. 18 is a rear elevation of a counting mechanism that will be explained later.

Fig. 19 is a front elevation of the same.

Fig. 20 is a vertical section of the apparatus illustrating a modification.

Fig. 21 is a fragmentary vertical section taken on the line 21—21 in Fig. 20, looking in the direction of the arrows.

Fig. 22 is a perspective view of a powder dispensing attachment.

Fig. 23 is a vertical section of the same.

Fig. 24 is an elevation showing part of the mechanism of this attachment.

In general arrangement, the apparatus consists of a cabinet shown in front elevation in Fig. 1, within which is a long strip of toweling which can be drawn forth to be used as desired. The used portions are alternately drawn back in the cabinet.

The cabinet casing comprises the front wall 25 with the door 26 and the side walls 27 and 28. The front wall of the cabinet has an upper door 30 in which there is a long horizontal slot 29 through which the towel is fed out to be used. The top of the casing is a hinged lid 31 which can be raised to introduce fresh supplies of toweling. In the front wall 25 is a vertical slot 32 through which a foot treadle 33 and a handle 33ª project. Near the upper part of the cabinet there is a coin receiving slot 34, and within is a shelf 35 on which lies a single long strip of toweling folded in zig-zag fashion. One end of this strip of toweling 36 passes over the removable bar 37 resting upon the brackets 38, thence behind the roller 39 and forward. Above the roller 39 is a bail whose intermediate member is 42 and whose arms 40 are pivoted at 41. A tension spring 43 pulls the intermediate portion 42 of the bail down on the roller 39.

The towel strip 36 next passes over the roller 44. On each side there is an arm 45 pivoted at 46 and pulled downward by a tension spring 47. Each arm 45 has pivoted to its extremity the middle point of the cross bar 48 and the ends of this cross bar 48 carry the ends of the rollers 49 which press the towel 36 down closely on the roller 44.

The roller 44 has helical strips of rubber cemented to its surface, these strips being wound oppositely on opposite ends of the roller so as to keep the towel strip 36 spread to its full width. The roller 44 has three circumferential grooves 51. A cross bar 52 is mounted in front of the roller 44 and has a backwardly extending lip 53 with a series of vertical holes 54 through which needles 66 carried by a cross bar 67 may project upwardly. The cross bar 52 also carries backwardly projecting fingers 55 which lie in the grooves 51. The slot through which the towel is fed forth has an overhanging lip 56.

Following the towel 36 in its course, after passing in front of the cross bar 52, it goes over the roller 57. At each side a bar 58 is pivoted at an intermediate point 59 and is acted upon by a tension spring 60. Each bar 58 carries a cross bar 61 in the ends of which are mounted the two rollers 62 which press the towel 36 down upon the roller 57. Each cross bar 61 also carries a projecting arm 63 and in the ends of the two arms 63 a cross rod 64 is mounted from which needles 65 hang downward, their points resting on the towel 36 on the roller 57.

Within the right hand part of the front casing wall 25 is a vertical rod 68 sliding in vertical guides and carrying the foot treadle 33 at its lower end. Attached to the upper end of this vertical bar 36 are a chain 69 and a cord 70. The chain 69 passes over the sprocket wheel 71 which is fixed on the collar 76, this collar 76 being loosely mounted on the shaft 87 which carries the roller 44. The face of the sprocket wheel 71 has a circumferential series of holes 72 and the shaft 87 also carries a clutch collar 73 slidably but non-rotatively engaging the same by a feather 85. This collar 73 has the studs 74 adapted to engage the holes 72. The loose sleeve 76 also carries a sprocket wheel 75 from which a chain 78 extends around the sprocket wheel 77, which is loosely mounted on the same shaft that carries the roller 57. The sprocket wheel 77 has a pawl 80 that engages a ratchet wheel 79 fixed on the shaft that carries the roller 57. The cord 70 already mentioned passes over a grooved pulley 81 loosely mounted on the same shaft. The cord 70 passes under the pulley 82 and has its end attached to the end of the chain 69. The pulley 82 carries a weight 83 moving in casing 84. The upper end of the bar 68 has pivoted thereto a spring held hook 170 adapted to engage the cross-lever 118. (See Fig. 5ª.) A fixed abutment 171 is provided to throw the hook 170 off when the lever 118 has been lowered a proper distance.

The shaft 87 has fixed thereon a gear pinion 86 which engages a gear wheel 91 loosely mounted on the vertical shaft 88. This vertical shaft 88 carries a collar 89 and a pawl 90 which engages a ratchet face 92 on the lower side of the gear wheel 91. A dog 93 engages the cogs of the gear wheel 91 and therefore prevents backward rotation of the latter. The vertical shaft 88 carries a disk 94 with the notch 95 in its edge. This disk 94 has its portion 96 at one side of the notch 95 thickened as shown in Fig. 6. Further down the shaft 88 carries a drum 97 whose lower end is formed as a single turn of a helix 98, the ends of this helical turn being connected by the vertical face 99. Around the drum 97 is a cylindrical sleeve 100 from which a stud 101 projects inside and is adapted to engage the helical face 98.

The vertical sliding bar 68 has a ledge 103 adapted to come up under the sleeve 100 and raise it. A fixed ledge 104 is provided to limit the downward movement of the sleeve 100. Adjacent to the sleeve 100 are guides 105 and one end of the member 106 which is fixed to the sleeve 100 engages one of these guides 105. The other end of the member 106 has pivoted thereon a finger 107 held by the spring 108 which presses it against the other guide 105.

The sleeve 100 carries a stud 109 which is engaged by the hook 110 pivoted on the bracket 111 carried by the bar 68. The clutch collar 73 is actuated by the upper forked end of the lever 112 which is pivoted on the bracket 113. The spring 114 acts on this lever so as to tend to engage the clutch. The lower end of this lever 112 has a notch 115 shown in Fig. 10, within which is a spring leaf 116, its lower end being secured at 117 and its upper end being free. The lever 118 has a stud 119 lying in the notch 115. The spring 120 normally holds the lever 118 up. This lever 118 is pivoted at 121 and the frame 124 is attached to the intermediate point 122. The frame 124 is guided by the slot and pin connection 123 and it carries the bar 67 and needles 66 previously mentioned. The end of the lever 118 has a pivoted dog 125 acted upon by spring 126 and adapted to engage the notch 95 in the disk 94.

The bar 68 is shown in Fig. 2 and elsewhere as continuous, but when it is desired to make the machine coin controlled, this bar may be made in two alining portions 128 and 129, as shown in Figs. 14 to 17, these two portions being held together by the tension spring 130. The member designated 131 in the drawing is a part of the upper bar 128. The upper end of the lower bar 129 has a vertical slot 132 and the dog 138 is pivoted therein at 133, its upper end carrying a weight 134. The coin 136 rests on the ledge 135 which is a part of the upper bar 128. The coin 136 is introduced at 34 and passes thence into the chute 137, the channel having an offset 127 to permit it to change its course. The chute 137 conducts the coin to take the position 136 shown in Fig. 15. In the position shown in Fig. 15 the dog 138 in its descent would be arrested by the abutment 139, but this dog 138 carries a projection 140 which strikes the coin 136 as shown in Fig. 16 and thus the dog 138 swings to the position shown in that figure. The bar 128 has a ledge 141 and a dog 142 is pivoted alongside of the same with the co-acting over-hanging ledge 143. A projection 144 from the lower bar 129 is adapted to strike the lower beveled face of the catch 142 and disengage the co-acting ledges 141 and 143. A chute 145 is provided to receive the coin 136 and this chute 145 is connected to the extension 146 which delivers the coin in the pan 147. The dog 138 carries a transverse plate 156 that acts upon the coin in the manner to be described presently.

The pivoted shaft 148 in the upper part of the machine has an arm 149 that normally rests on the towel 36 where it stretches across between the rollers 39 and 44. This shaft 148 is connected by an arm 150, link 151, and arm 153 on the shaft 152, so as to actuate a finger 154 entering the slot 155 in the side of the coin chute 34. Thus when the towel is exhausted in the machine, the coin slot is blocked.

The already mentioned lever 118 has pivoted thereon a depending link 157 which carries at its lower end a pawl 158 adapted to engage the notches in the vertical slide 159. The tension spring 160 holds this slide 159 up. The pawl 161 has a fixed pivot and is also adapted to engage the notches in slide 159. A pin may be placed in any one of the holes 162 so as to limit the downward movement of the slide 159. These holes are numbered as shown and on its front face the slide 159 carries corresponding numbers 163 adapted to show through the hole 164 in the front casing wall 25. An arm 165 is adapted to be swung so as to disengage both pawls 158 and 161 from the teeth on the slide 151. This arm 165 has a key socket 166 at its pivot, which is accessible from the front of the cabinet.

The modification shown in Figs. 20 and 21 has a drum 167 mounted in socket 168 above the shelf 35. This drum 167 has flanges 169 at its ends and the towel to be used is wrapped around the same.

The strip of toweling 36 may be introduced in the machine by raising the top cover 31 and lifting out the cross bar 37. Then the strip of toweling may be passed along the course already described and shown in Fig. 3.

When a person desires to use a portion of this toweling 36, he drops a proper coin in the slot 34 and it falls down and takes the position shown at 136 in Figs. 14 and 15. Then he pushes down on the handle 33ª or on the treadle 33. This brings the pin 140 of the dog 138 down on the coin 136 and this swings the dog 138 over to the position shown in Fig. 16, so that it clears the abutment 139 and the treadle descends farther. When the upper bar 128 is pulled down, the hook 170 on the upper end of the bar 128 (or 68) pulls the lever 118 down so that the dog 125 passes down through the notch 95 whereupon the spring 126 snaps it over to one side so that thereafter the disk 94 holds it and the lever 118 down. The pin 119 at the same time descends below the spring 116 whereupon the spring 114 throws the clutch collar 73 into engagement with the sprocket wheel 71. A further downward movement of the bar 68 (or 128) causes the hook 170 to strike the abutment 171 which disengages it from the bar 118. The clutch 73—71 being in engagement with the further downward movement of the bar 68 (or 128) causes the chain 69 to rotate the roller 44 and thereby feed the towel out of the slot 29. This is permitted because the downward displacement of the lever 118 has depressed the needles 66 which were previously sticking up through the towel 36.

The downward movement of the bar 68 is communicated through the hook 110 and stud 109 to the sleeve 100 so that the latter is pulled down until the spring 108 snaps the stud 101 under the lower end of the helical guide face 98 as shown in Fig. 7. When the sleeve 100 strikes the stop ledge 104 the pin 101 is disengaged from wall 99. The rotation of the shaft 88 meanwhile will have rotated the drum 97 a little so that the vertical face 99 acting against the stud 101 will carry the sleeve 100 around a little but the spring 108 acting through the mechanism shown in Fig. 8 will snap the sleeve 100 back to the position shown in Fig. 7.

A further downward movement of the bar 68 will feed out a sufficient length of toweling for use as shown in Fig. 4, but at the downward limit of the travel of the foot treadle 33, the disk 94 will have made one complete revolution and the thickened part 96 thereof striking the dog 125 will push it over against the tension of the spring 126 and permit the spring 120 to jerk the lever 118 up, causing the needles 66 to engage the towel 36 and prevent further withdrawal thereof. This will also cause the stud 119 to shift the lever 112 and disengage the clutch 73—71.

After the user is through with the exposed portion of the toweling as shown in Fig. 4, he releases the foot treadle 33, and thereupon the weight 83, acting through the cord 70, pulls the bar 68 (or 128) up and the parts come to the initial position shown. During this movement, the pawl 80 and ratchet 79 are in engagement and the roller 57 accordingly draws all the used portion of the towel into the cabinet where it accumulates as shown in Fig. 2.

If the user fails to throw the treadle 33 clear down far enough to cause the notched disk 94 to make one complete revolution, then as the bar 68 ascends its ledge 103 catches under the sleeve 100 and raises it. This causes the stud 101 to engage the helix 98 and complete the rotation of the shaft 88, the pawl 90 and ratchet 92 facilitating this.

The upward movement of the upper sectional bar 128 is arrested by the engagement of the shoulder 141 with shoulder 143 and the spring 130 pulls the lower sectional bar 129 up; this causes the face 156 of the dog 138 to shove the coin 136 over into the chute 145. Next the shoulder 144 strikes the dog 142 and disengages the shoulders 141 and 143 permitting the parts to come to their initial position.

Each time the machine is operated the descending lever 118 causes the pawl 158 to lower the notched slide 159 by one notch, which is held by pawl 161. By fixing the pin in the proper hole 162, the number of successive uses of towel may be limited as desired. An attendant by means of a key in socket 166 can release the pawls 158 and 161, thus permitting the spring 160 to restore the slide 159 to its initial position. The exposed number 163 shows at any time the number of uses of the towel that have occurred since the last release of the pawls 158 and 161.

The operation of the modification shown in Figs. 20 and 21 will be obvious in view of the description which has been given.

Figs. 22, 23 and 24 illustrate a device for dealing out a small quantity of powder to each user of the machine. The powder magazine 180 has a screw conveyer 181 in its bottom which delivers through the tube 190 into the cup 191. The said screw conveyer 181 carries a ratchet wheel 182 acted upon by the pawl 185 on the pivoted arm 184. The vertically reciprocating bar 68 has a catch 183 adapted to depress the arm 184 when the bar 68 is lowered. The cup 191, already mentioned, is carried on a rotatable shaft 188 which has an arm 187. The spring 189 rotates the shaft 188 so as to hold the arm 187 against the abutment 186. The operator can rotate the shaft 188 in the opposite direction by means of the hand wheel 192.

It will be seen that one depression of the bar 68 will cause a small measured quantity of powder to drop into the cup 191 and the user can get this by rotating the wheel 192, thus dropping the powder into his hand. The rotation of the wheel 192 causes the arm 187 to engage the lower member 184ᵃ of the arm 184 and restore the latter to the position shown in Fig. 22. If the user does not take the powder then the arm 184 remains down and this device does not come again in operation until some user has rotated the cup 191 and secured the powder therefrom.

It will be seen that I have invented a device that will facilitate the use of consecutive portions of a long towel without permitting re-use of the soiled portions, and without permitting use of excessively extended portions thereof. The coin controlling feature can be used or not as desired and the device for limiting the number of uses of the towel is also optional. The latter device should preferably be used when the apparatus as a whole is not coin controlled.

I claim:

1. In a device of the class described, a cabinet, means in said cabinet to support a long towel, said cabinet having a slot in the wall thereof, a bar back of said slot, a set of needles coacting with said bar and acting normally to engage said towel, and means to release said needles and feed said towel over said bar and out through said slot.

2. In a device of the class described, a cabinet, two rollers within said cabinet, a cross bar in front of said rollers and within the cabinet, said cabinet having a slot in its wall in front of said cross bar, said rollers being adapted to support a long towel passing around the rollers and in front of said cross bar, means to actuate the upper roller so as to feed slack towel out through said slot, and means to act in alternation therewith to draw the slack towel back into the cabinet by the operation of the other roller.

3. In a device of the class described, a cabinet, means in said cabinet to support a long towel, said cabinet having a slot in the wall thereof, a bar back of said slot, a set of needles coacting with said bar and acting normally to engage said towel, means to release said needles and feed said towel over said bar and out through said slot, means acting after a definite length of towel has been fed out to restore said needles to engaging position, and means to withdraw said length of towel through said slot and past said bar at the side thereof opposite said needles.

4. In a device of the class described, a cabinet, a roller within said cabinet around which a long towel is adapted to pass, an arm pivoted adjacent said roller, a cross bar pivoted on said arm, rollers mounted on said cross bar, and a spring coacting with said arm to press said last named rollers evenly against the first named roller.

5. In a device of the class described, a cabinet, a long towel within the same, two rollers around which said towel passes, a sprocket wheel loosely mounted on the shaft of one roller, a clutch to lock said sprocket wheel to said shaft, a chain passing over said sprocket wheel, means actuated with the initial movement of the chain to throw the clutch into engagement, and means actuated by the terminal movement of the chain to draw the clutch out of engagement.

6. In a device of the class described, a roller arranged to feed a long towel around the same, a reciprocating element adapted to rotate the roller when moved in one direction, a clutch adapted to operatively connect said reciprocating element to turn said roller, and means to turn the roller a definite distance in case the said reciprocating element is moved over only a portion of its course.

7. In a device of the class described, a cabinet, means to feed a long towel therefrom, means to lock the towel, a lever to operate said locking means, a spring acting on said lever, a notched disk adjacent the end of the lever, a dog pivoted on the end of the lever and normally engaging said notch, and means to displace the dog when the lever is lowered enough to make it clear the notch, whereby the disk acting on the dog will hold the lever displaced until the disk makes a complete revolution and brings the notch again in position to be engaged by the dog.

8. In a device of the class described, a shaft carrying one turn of a helix, a stud engaging said helix, means to rotate said shaft and at the same time displace said stud longitudinally, and means acting alternately to return the stud so that it will pick up the helix and acting thereon complete any partial revolution of the said shaft.

9. A device of the class described comprising a cabinet, means to feed a long towel from said cabinet, an operating member for actuating said feeding means, and means actuated by return movement of said operating member arranged to insure a complete operation of said feeding means, substantially as described.

10. In a device of the class described, a cabinet, means to feed a long towel from said cabinet, an operating member for actuating said feeding means, an arresting means adapted normally to prevent feeding of said towel, means actuated upon operation of said operating member to release said arresting means and permitting the feeding of said towel, means actuated by said operating member to prevent operation of said arresting means until a predetermined length of towel has been fed out of said cabinet, and means actuated by said operating member after it has been released by the operator to insure a complete operation of said feeding means.

11. In a device of the class described, a cabinet, feeding means adapted to feed a long towel from said cabinet, a needle holder, a plurality of needles mounted on said needle holder and adapted normally to engage said towel to prevent feeding thereof, an operating member for actuating said feeding means, means carried by said operating member for effecting the disengagement of said needles with said towel when said operating member is actuated, means to release said last named means from said needle holder after a predetermined movement of said operating member, and means acting thereafter to prevent the return of said needle holder to operative position until a predetermined length of towel has been fed out of said cabinet.

12. In a device of the class described, a cabinet, means for feeding a long towel from said cabinet, arresting means adapted normally to prevent feeding of said towel, an operating member, means actuated upon the initial movement of said operating member to release said towel arresting means, automatic means for operatively connecting said operating member to actuate said feeding means after said arresting means has been released, and separate automatic means to hold said arresting means in released position thereafter during the continued operation of said operating member until a predetermined portion of said towel has been fed out of said cabinet.

In testimony whereof, I have subscribed my name.

ROBERT S. CORLETT.

Witnesses:
  SAM WOLF,
  HENRY A. PARKS.